Aug. 9, 1955 H. L. MEGERLE 2,714,778
FISHING LURE
Filed Oct. 1, 1953

INVENTOR.
HERBERT L. MEGERLE
BY
ATTORNEY

United States Patent Office 2,714,778
Patented Aug. 9, 1955

2,714,778
FISHING LURE
Herbert L. Megerle, Rochester, N. Y.

Application October 1, 1953, Serial No. 383,471

1 Claim. (Cl. 43—42.12)

The present invention relates to artificial fishing lures, and more particularly to artificial fishing lures such as used in trolling and casting.

A primary object of the invention is to provide a fishing lure having rotary parts so constructed that as the lure is drawn through the water, these parts will be constrained to rotate and by their free and rapid rotation will attract and tempt the fish to take the bait.

A furher object of the invention is to provide a fishing lure that will not easily become snagged between weeds, or logs or other underwater objects when drawn through the water.

Another object of the invention is to provide a fishing lure which is attractive in appearance, inexpensive in construction, and capable of withstanding hard usage.

Other objects of the invention will be apparent hereinafter from the specification and frome the recital of the appended claim.

Figure 1:
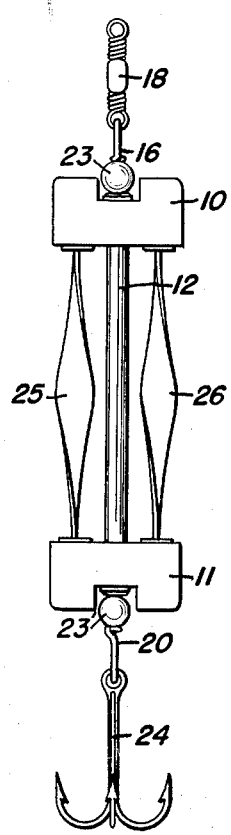
Figs. 1 and 2 are elevations, taken at right angles to one another, of a fishing lure constructed according to one embodiment of the invention.
Figure 2:
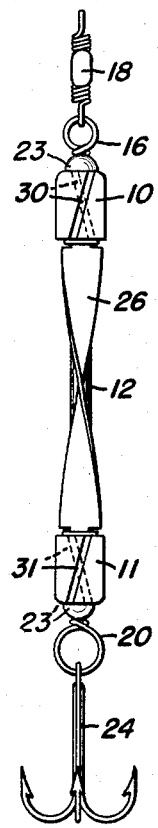
Figure 3:
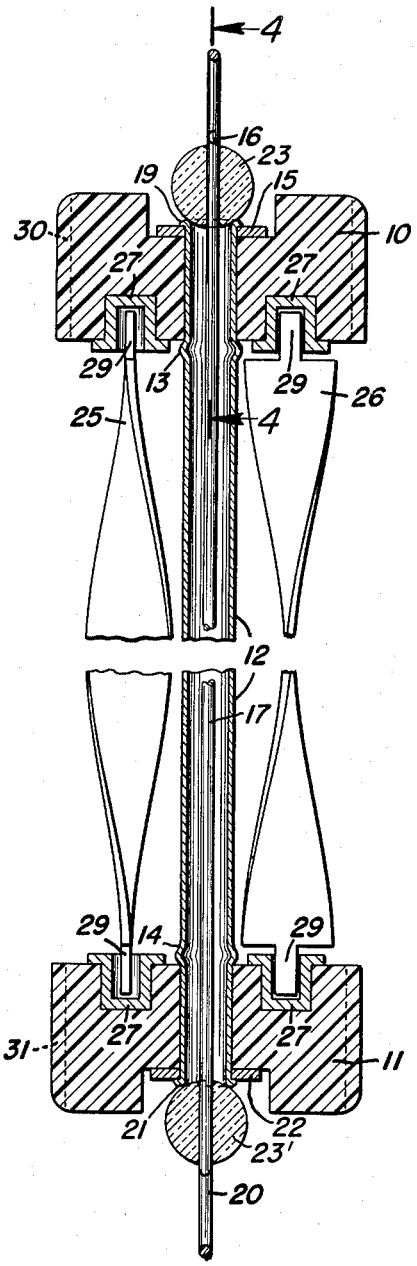
Fig. 3 is a fragmentary section through this lure on an enlarged scale.

Referring now to the drawings by numerals of reference, and first to the embodiment of the invention shown in Figs. 1 to 4 inclusive, the lure shown comprises two blocks 10 and 11 which may be made of wood, metal, plastic or other suitable material. These blocks are connected to one another in axially spaced relation by a tube 12, which is swaged outwardly, as denoted at 13 and 14, to provide shoulders against which the upper block 10 and the lower block 11, respectively, seat. The upper block 10 is secured on the tube 12 by a washer 15 and by spinning over the tube, as denoted at 19. The lower block 11 is secured on the tube 12 by a washer 22 and by spinning over the tube, as denoted at 21. In addition, the blocks 10 and 11 are glued or otherwise rigidly secured to the tube against rotation thereon.

The blocks 10 and 11 and the tube 12 are adapted to rotate as a unit on a wire or rod 17 which is formed at opposite ends with loops or eyelets 16 and 20, respectively, and which extends axially through a ball 23, the tube 12 and a ball 23'. The eyelets 16 and 20 and balls 23, 23' act as stops and keep the wire or rod 17 from dropping through tube 12. The balls are of greater diameter than the internal diameter of the tube. The eyelet 16 connects the rod 17 with a conventional swivel member 18 which, in turn, is secured to the fishing line. The barbed hooks 24 are suspended from the eyelet 20.

Mounted between the two blocks 10 and 11 at opposite sides, respectively, of the tube 12 are two blades 25 and 26. Each blade comprises a metal or plastic strap that is twisted into helical shape. Each of the two blades 25, 26 is mounted at its opposite ends directly in the blocks 10 and 11, or, as shown, in grommets 27 so that it is free to rotate about its longitudinal axis. The blades 25, 26 might be cemented at their ends to the grommets, and the grommets might then be rotatable in the blocks 10 and 11, but preferably the blades 25 and 26 are made with bearing projections 29 at opposite ends which rotate freely in the grommets 27.

Opposite sides of the blades 25 and 26 are preferably of different colors. Each of the blocks 10 and 11 may be grooved on its opposite ends, as denoted at 30 and 31, respectively, to cause the lure to spin on the rod 17 as the lure is drawn through the water, or as the water flows past it. The lure comprises, therefore, a support which is mounted to rotate on the rod or wire 17, and which carries two blades 25, 26 which are free to rotate on the supporting blocks 10 and 11 and independently of the swivel motion of the supporting blocks.

By making the blades of different colors on opposite sides, the attraction of the lure to the fish is increased. By making the blades as shown, they lie within the compass of the blocks 10 and 11 so that they are protected by the blocks 10 and 11 and are less likely to become entangled in undergrowth or debris. The like thin blades 25 and 26 will, moreover, spin readily with any flow or movement of the water relative to the lure. The lure is simple to construct, and relatively inexpensive, and will not easily get out of order.

Figure 5:
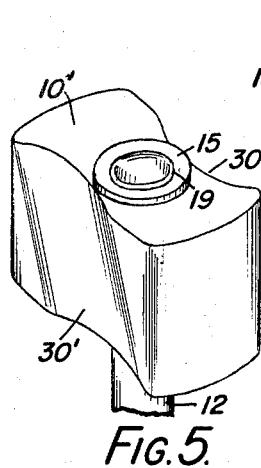
Fig. 5 is a fragmentary perspective view looking at the top of a slightly modified form of block.
Figure 4:
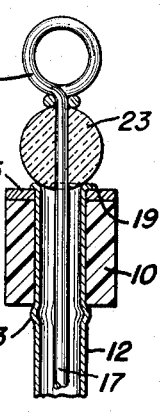
Fig. 4 is a fragmentary section taken on the line 4—4 of Fig. 3, looking in the direction of the arrows.

In order to enhance the spinning action of the lure itself the upper block may be made as shown at 10' in Fig. 5. Here the block is formed on opposite sides with helical grooves 30' that extend diagonally across the major portion of the width of the block from top to bottom. The block 10' may be substituted for block 10 and attached to tube 12 in the same manner as described with reference to block 10.

While the invention has been described in connection with a specific embodiment thereof, it will be understood that it is capable of further modification, and this application is intended to cover any variations, uses, or adaptations of the invention, following, in general, the principles of the invention and including such departures from the present disclosure as come within known or customary practice in the art to which the invention pertains, and as fall within the scope of the invention or the limits of the appended claim.

Having thus described my invention, what I claim is:

A fishing lure comprising a rod connectable at opposite ends to a fishing line and a fishing hook, a support rotatable on said rod and comprising a pair of blocks, and a tubular spacing member surrounding said rod and securing said blocks together in parallel, spaced relation, and a pair of helical blades mounted between said blocks to rotate on parallel axes parallel to the axis of rotation of said support, said blades being mounted at opposite sides, respectively, of said spacing member and each being journaled at its opposite ends in said blocks, said blocks being of a length and width to project at their sides and ends beyond said blades.

References Cited in the file of this patent

UNITED STATES PATENTS

| | | |
|---|---|---|
| 1,842,127 | Stickel et al. | Jan. 19, 1932 |
| 2,389,423 | Evans | Nov. 20, 1945 |
| 2,467,151 | Nordquist | Apr. 12, 1949 |
| 2,526,077 | Jurczak | Oct. 17, 1950 |
| 2,562,743 | Schindler et al. | July 31, 1951 |